F. H. ZEIGEN.
ELECTRIC COOK STOVE.
APPLICATION FILED MAR. 18, 1909.
958,458.
Patented May 17, 1910.
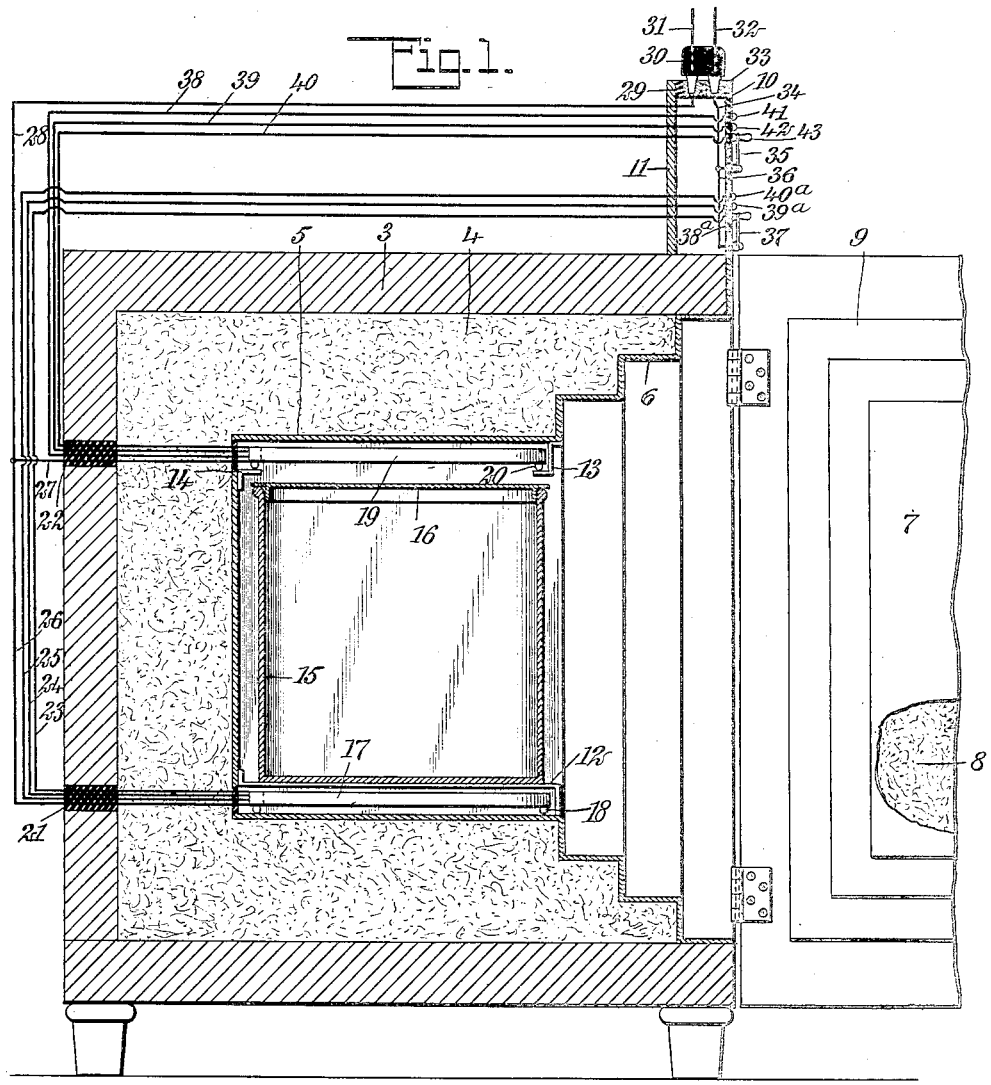
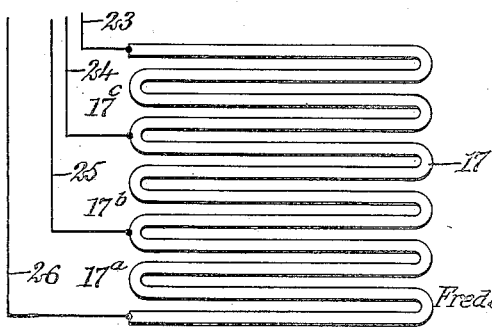
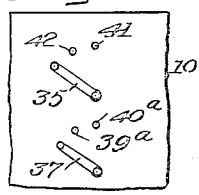
WITNESSES
L. Almquist
Walton Harrison
INVENTOR
Frederic Haermann Zeigen
BY Munn & Co
ATTORNEYS

UNITED STATES PATENT OFFICE.

FREDERIC HAERMANN ZEIGEN, OF DETROIT, MICHIGAN.

ELECTRIC COOK-STOVE.

958,458.

Specification of Letters Patent. Patented May 17, 1910.

Application filed March 18, 1909. Serial No. 484,138.

*To all whom it may concern:*

Be it known that I, FREDERIC HAERMANN ZEIGEN, a citizen of the United States, and a resident of Detroit, in the county of Wayne and State of Michigan, have invented a new and Improved Electric Cook-Stove, of which the following is a full, clear, and exact description.

My invention relates to electric cook stoves, my more particular purpose being to provide a form of stove more or less analogous to a so-called "fireless cooker", and to fit within the same a number of electrically-operated heating units for the purpose of supplying heat to the stove.

My invention further relates to means for regulating the heat, which I do by a proper distribution of the heating units, by cutting in or cutting out a suitable amount of the resistance offered by the heating units themselves.

Reference is to be had to the accompanying drawings forming a part of this specification, in which similar characters of reference indicate corresponding parts in both the figures.

Figure 1 is a substantially central vertical section through a cook stove made in accordance with my invention, this view showing the position of the central vessel or other article to be heated, and further showing generally the distribution of the heating units and conductors leading thereto; and Fig. 2 is a diagrammatic plan of one of the heating units complete, showing the same as virtually subdivided into sections which may, to some extent, be energized independently of each other. Fig. 3 is a fragmentary front elevation showing the switch arms and contact buttons.

The outer casing of the stove is shown at 3 and disposed within the same is a filling 4 of material such as is a non-conductor of heat. Mounted centrally within the filling 4 is a lining 5 which is preferably of metal, but in any event is of material capable of resisting heat. The lining 5 is bent into steps 6 and these form a doorway. At 7 is a door which is hinged relatively to the casing 3 and is provided with a filling 8 and with steps 9, these steps mating the steps 6 so as to render the escape of heat, or of heated air or vapor, as the case may be, more circuitous, thus conserving the heat within the lining 5. A portion 10 of the lining 5 is bent upwardly and forms in effect the front wall of a switch, the rear wall of the same being shown at 11. At 12, 13, 14 I provide rests, and mounted upon the rests 12, one of which is shown in Fig. 1, is a vessel 15, provided with a top 16, and used for cooking. At 17, immediately below the rests 12, is a heating unit, the general form of which can be understood from Fig. 2. It is essentially a resistance unit, bent back and forth upon itself so as to have generally a sinuous form. Supports 18 are connected with the resistance unit for the purpose of sustaining it clear of the floor of the stove. Another heating unit is shown at 19, and is provided with supports 20 which engage the rests 13, 14. The back of the stove is provided with bushings 21, 22 of insulating material, and extending through the bushing 21 are wires 23, 24, 25, 26 (see Fig. 2), which are attached to the resistance unit 17 in such manner as virtually to subdivide it into the three sections $17^a$, $17^b$, $17^c$. Connected with the wire 26 is a wire 27, which extends through the bushing 22 and joins the heating unit 19. A wire 28 joins the wires 26, 27 and leads upwardly to a sleeve 29 connected with the switch. A plug 30 is used for the purpose of turning the current on and off, and this plug is connected with the supply wires 31, 32. At 33 is another sleeve, also mounted upon the switch, and from this sleeve a wire 34 leads downwardly to an arm 35. A wire 36 is connected with this arm and with the wire 34, the wire 36 leading downwardly to another arm 37. The arm 37 turns angularly upon a center and disposed partially within the path are buttons $38^a$, $39^a$, $40^a$, these being disposed in an arcuate row and connected respectively with the wires 23, 24, 25. Similarly buttons 41, 42, 43 which are disposed partially within the path of travel of the arm 35, are connected with the wires 38, 39, 40. The arms 35, 37 turn angularly upon their pivotal supports.

The operation of my device is as follows: The vessel 15 containing foods to be cooked is placed upon the rests 12, or, if desired, instead of the vessel 15, a piece of meat or the like may be placed directly in position upon the rests 12. The plug 30 is now inserted in position, as indicated in Fig. 1, and the door 7 is closed so as to prevent the escape of heat. The operator next turns the arms 35, 37, or either of them, for the purpose of throwing into the heat units 17, 19 as much current as desired.

As will be understood from Fig. 2, the virtual subdivision of the heat units into sections (see 17ᵃ, 17ᵇ, 17ᶜ) enables the operator to cut in or to cut out by sections any desired amount, within reasonable limits, of the total resistance offered by the heat units. The two heating units 17, 19 are in multiple with each other in the sense that they are both supplied directly in parallel by aid of the wire 28. The current passing through either of the resistance units 17, 19, may pass either through the entire unit or through one-third of the same, as will be understood from Fig. 2.

Supposing that the arms 35, 37 are in proper position to allow each heat unit to be traversed throughout its entire length, the circuit is as follows: Wire 31, sleeve 29, wire 28, thence in parallel through wires 27, 26 to the respective resistance units 19, 17, thence out in parallel through wires 23 and 40, the current from the wire 23 now passing through button 38ᵃ, arm 37, wires 36, 34, sleeve 33, and wire 32—the current from the unit 19 passing through wire 40, button 43, arm 34, wire 34 (here joining current through wire 36), sleeve 33, and wire 32. By turning either of the arms 37, 35, one or more sections of the corresponding heating unit 17, 19 are short-circuited and therefore thrown out of action. The above arrangement of the wires gives the operator a very direct and exact control over the temperature inside of the stove. He can throw into action any one or more of the three sections of either of the heating units, so that the heat may represent any degree below the maximum capacity of both heating units down to the heating due to a single section of one unit.

In practice it is advisable to turn on the heat, not too rapidly, until the interior of the stove acquires a sufficiently high temperature, and then almost shut off the supply of current so that all the heat to which the interior of the stove, and its contents, are subjected, is the heat supplied for the purpose of maintaining, rather than increasing, the temperature. In this device, as in fireless cookers and so-called "caloric" conservators of heat, the quantity of heat required to be supplied continuously is exceedingly small, owing to the very fact that the heat is not allowed to escape and thus become wasted.

Among the practical advantages afforded by my electric cook stove are the following: The heating units occupy but little space, owing to their small size, and this is promotive of economy, both as regards the available space inside of the stove and as regards the compactness of the stove. The filling in the stove and in the door, together with the stepping of the door and stove, so closely curtail the amount of heat allowed to escape, that probably not more than one-tenth of the heat otherwise required is necessary. The closely fitting cover prevents to a great extent the escape of steam and odors. Inasmuch as the heat can be applied when the door is closed, there is no necessity for cooking or even heating the food before the latter is placed in the stove. If necessary, the heating units can be rendered red hot, thus enabling the operator to roast, fry, bake and broil, as well as do other forms of cooking.

I do not limit myself to the particular form of door shown, nor to any special position to be occupied by this door. Neither do I limit myself to the exact arrangement of the filling, the casing and the lining of the stove, nor to the wiring shown, the scope of my invention being commensurate with my claim.

Having thus described my invention, I claim as new and desire to secure by Letters Patent:

In an electric stove, the combination of a receptacle provided with a lining, said lining having a portion extending outwardly from said receptacle, a wall disposed adjacent to said portion of said lining, switch mechanism mounted upon said portion of said lining and upon said wall, heating units disposed within said receptacle, and connections from said switch mechanism to said heating units, for the purpose of varying the currents flowing through said heating units.

In testimony whereof I have signed my name to this specification in the presence of two subscribing witnesses.

FREDERIC HAERMANN ZEIGEN.

Witnesses:
  FRED. T. BUTZIER,
  C. H. ROYER.